(12) United States Patent
Grunhold

(10) Patent No.: US 7,725,129 B2
(45) Date of Patent: May 25, 2010

(54) CELL PHONE BASED VEHICLE CONTROL SYSTEM

(76) Inventor: Oliver David Grunhold, 960 Knox St., Unit B, Torrance, CA (US) 90502

( * ) Notice: Subject to any disclaimer, the term of this patent is extended or adjusted under 35 U.S.C. 154(b) by 494 days.

(21) Appl. No.: 11/749,578

(22) Filed: May 16, 2007

(65) Prior Publication Data

US 2008/0287074 A1 Nov. 20, 2008

(51) Int. Cl.
*H04M 1/00* (2006.01)
*G05D 1/00* (2006.01)
*G05D 3/00* (2006.01)
*G06F 7/00* (2006.01)
*G06F 17/00* (2006.01)
*G01C 22/00* (2006.01)
*B60R 25/10* (2006.01)

(52) U.S. Cl. ............... 455/556.1; 455/569.2; 701/1; 701/2; 701/24; 340/426.18; 340/426.24; 340/426.36

(58) Field of Classification Search ............... 455/41.3, 455/556.1, 557, 569.2; 701/1, 2, 24, 29, 701/33, 36, 200, 213; 340/933, 988, 426.18, 340/426.24, 426.36, 438, 539.24
See application file for complete search history.

(56) References Cited

U.S. PATENT DOCUMENTS

| | | | | |
|---|---|---|---|---|
| 6,028,537 | A * | 2/2000 | Suman et al. | 340/988 |
| 6,677,854 | B2 * | 1/2004 | Dix | 340/438 |
| 6,732,031 | B1 * | 5/2004 | Lightner et al. | 701/33 |
| 6,801,942 | B1 | 10/2004 | Dietrich et al. | |
| 6,801,952 | B2 | 10/2004 | Belzile | |
| 6,865,460 | B2 * | 3/2005 | Bray et al. | 701/36 |
| 7,069,127 | B2 | 6/2006 | Stouffer et al. | |
| 7,082,359 | B2 | 7/2006 | Breed | |
| 7,228,211 | B1 * | 6/2007 | Lowrey et al. | 701/29 |
| 7,245,997 | B2 * | 7/2007 | Kitao et al. | 701/29 |
| 7,363,129 | B1 * | 4/2008 | Barnicle et al. | 701/29 |
| 2003/0167345 | A1 * | 9/2003 | Knight et al. | 709/249 |
| 2004/0093291 | A1 | 5/2004 | Bodin | |
| 2004/0142722 | A1 * | 7/2004 | Everett | 455/550.1 |
| 2004/0185842 | A1 * | 9/2004 | Spaur et al. | 455/420 |
| 2005/0085953 | A1 | 4/2005 | Hoenninger et al. | |
| 2005/0174220 | A1 | 8/2005 | Flick | |
| 2006/0052922 | A1 * | 3/2006 | Koenig et al. | 701/36 |
| 2006/0178792 | A1 | 8/2006 | Ortiz et al. | |

(Continued)

*Primary Examiner*—Nay A Maung
*Assistant Examiner*—Andrew Wendell
(74) *Attorney, Agent, or Firm*—David A. Belasco; Belasco Jacobs & Townsley, LLP

(57) ABSTRACT

A cell phone based vehicle control system includes a vehicle having an electronic network for the vehicle's electrical devices. A data interface module is serially connected to a central processing module and the electronic network. A transceiver module is serially connected to the central processing module and the data interface module. A cellular telephone communicates wirelessly with the transceiver module. The central processing module includes at least one analog connection for use with non-electronic network equipped vehicles. The data interface module provides data translation between the vehicle's electronic network and the central processing module. The transceiver module and cellular telephone include compatible data encryption/decryption units. The transceiver module includes a Global Positioning System (GPS) unit capable of identifying the location of the vehicle. The cellular telephone operates systems including remote locking, arming/disarming of an alarm system, engine start, panic mode, remote driver specific vehicle adjustments and remote auxiliary command functions.

21 Claims, 2 Drawing Sheets

U.S. PATENT DOCUMENTS

| | | |
|---|---|---|
| 2006/0229777 A1* | 10/2006 | Hudson et al. ............... 701/29 |
| 2006/0271246 A1 | 11/2006 | Bell et al. |
| 2007/0016362 A1 | 1/2007 | Nelson |
| 2007/0021885 A1 | 1/2007 | Soehren |
| 2007/0100513 A1* | 5/2007 | Asano ......................... 701/2 |
| 2007/0112492 A1* | 5/2007 | Hyodo et al. ................ 701/49 |
| 2007/0294033 A1* | 12/2007 | Osentoski et al. ........... 701/213 |
| 2008/0114914 A1* | 5/2008 | Cloutier et al. ............. 710/110 |
| 2008/0255888 A1* | 10/2008 | Berkobin et al. .............. 705/4 |

* cited by examiner

CELL PHONE BASED VEHICLE CONTROL SYSTEM

FIELD OF INVENTION

This invention relates to the field of vehicle control systems and more specifically to systems for gathering information and controlling functions of a vehicle by means of a remote, wireless connection operating over extended distances.

BACKGROUND OF THE INVENTION

Car alarms and remote starters have been installed in vehicles both as original equipment and as aftermarket products for a number of years. As originally conceived, these devices had to be wired into the ignition and power systems of vehicles and the aftermarket products often required substantial electrical connections to existing systems plus the installation of various sensors and switches not supplied as original equipment with the vehicle. In recent years, as vehicles have become more electronic and microprocessor driven, many vehicles systems and controls are included in an integrated electronic system supplied with the vehicle. One example of these systems is known as the Controller Area Network or CAN system. This system provides connections to virtually all vehicle systems from power windows, seats and door locks to alarms, vehicle sensors (tire pressure, water temperature, oil pressure, fuel level, etc.) heating and air conditioning and remote starting. Having a vehicle equipped with such a system provides an opportunity to connect to such a system to provide for control of the functions and information available through the CAN system. Until recently, secure, efficient systems for addressing this functionality over long distances were not available. The present invention addresses these needs.

U.S. Pat. No. 6,801,952, issued to Dietrich et al, discloses a system for remotely accessing and controlling CAN node arrangements during vehicle operation. In the embodiment shown, the CAN node arrangement includes a modem, a cellular phone, and a CAN/TCP gateway arrangement. A remote accessing control arrangement is linkable to the CAN node arrangement using wireless communications and TCP/IP, or any other appropriate transmission protocol. The base station or coupling arrangement is used to link with the cell phone. The communication linking arrangement may include a dial-up server and an associated local area network, another cell phone and modem or a wire-line modem for linking the remote accessing controller arrangement. The CAN node arrangements may respectively include, for example, vehicle electronic control units for providing engine control, transmission control, and vehicle stability control. Also, for example, the CAN node arrangements may include a steering angle sensor, a door lock control module, and a window lifter module. While these CAN node arrangements described above include vehicle electronic control units, the apparatus, method and system applies to any suitably appropriate CAN node arrangement, such as, for example, vehicle sensors and/or control modules.

U.S. Patent Application No. 2005/0085953, published by Hoenninger et al. is directed to a method of using a vehicle-external portable unit, such as a cell phone, and a corresponding control device for controlling the operational sequences of a vehicle. A vehicle-internal hardware structure is illustrated in which control devices are interconnected via a communications system. The vehicle-external portable unit is not part of the vehicle-internal hardware system, but is basically used inside and outside the vehicle in a general manner. It may be connected to a vehicle-internal hardware interconnection. A first interface unit connects the external unit to, for example, a CAN network, TT-CAN network, a flex-ray bus system or other variants of communications systems, such as TTP/C, LIN bus, or a MOST bus system. This makes it possible to support vehicle functions for controlling the operational sequences via the control-device interconnection. The hardware system also includes sensors and actuators, which are either directly connected to the control device or else are coupled to the control-device interconnection via the communication connection.

U.S. Patent Application No. 2006/00271246, published by Bell et al., illustrates the systems and methods for remote vehicle management. A block diagram of a preferred embodiment of the system is provided. The system includes: a computer, preferably embedded and including a micro-controller and a processor connected to the micro-controller, a wireless communication module connected to the processor, an audio interface connected to the processor, a GPS receiver module connected to the processor, at least one vehicle condition sensor connected to the micro-controller, and a local control interface connected to the processor. In addition, the system includes a remote engine start/stop controller, a SIM (subscriber identity module) card to uniquely identify the subscriber using the system, and a gyroscope to add dead-reckoning functionality when adequate GPS signals are unavailable.

U.S. Pat. No. 7,069,127, issued to Stoufer et al., disclose a module for use with a vehicle control device and/or system. The vehicle control system provided includes an interface module connected to electronic input and output devices and a feature set module for detachably coupling to the interface unit. The interface unit contains programming for controlling functions of an alarm system. The module can be programmed to allow a transmitter/remote control to be utilized to control the following features/functions: (1) starting a car remotely; (2) illuminating the lights of a vehicle remotely; (3) operating a power/sliding door; (4) operating a power sunroof; (5) operating a power window; (6) operating a vehicle seat; (7) unlocking one or more doors; (8) overriding an interior theft sensor; (9) reducing the current usage from the vehicle control system; (10) placing the vehicle control system in hibernation sleep node; (11) interfacing with a home control system; (12) interfacing with a garage control system; (13) interfacing with other alarm or control systems; (14) identifying which sensors have been tripped; (15) deactivating lost remote controls/transmitters; (16) securing an emergency override button; (17) engaging the starter motor anti-grind circuit; (18) controlling front and rear window defrosters; (19) controlling hub pin switch safety features; (20) controlling the neutral safety switch input; (21) placing the vehicle in diesel mode; and, (22) selecting how long to activate a vehicle's starter. The serial communication inputs and outputs can be utilized to interface with hand-held electronic devices, various telematics products, such as cell phones, vehicle control modules, etc.

U.S. Patent Application No. 2007/0021885, published by Soehren is directed to a system and method for personalizing the ride and/or handling characteristics of a motor vehicle. An example system is disclosed, which includes a processing unit, a memory unit, an interface unit, and a plurality of electronic control modules coupled to each other by a high speed data rate communications bus. The interface unit is also coupled to a read unit and a wireless input unit. The system can be operated in a centralized mode or a distributed mode. The read unit and the wireless input unit can read in and forward to the interface unit an individual's personal ride and/or handling characteristics data which is stored in a memory component of a device in that individual's possession, for example, a PDA or a cell phone. The read unit would then include, for example, a docking station for the device which would convey the individual's personalized data from the memory component to the interface unit.

It is an objective of the present invention to provide a simple and error free way to interface a vehicle alarm and/or remote start unit with attached vehicle network system. It is a further objective to provide means for communicating with the vehicle network system, both for control of vehicle functions and display of vehicle sensor readings, by means of a remote wireless system. It is a still further objective of the invention to provide such communications over long distances and at minimal cost to the user. It is yet a further objective to provide these communications in a secure, encrypted protocol. Finally, it is an objective of the present invention to provide such a system that is economical to produce, readily adapted to different vehicles, and easy to install and maintain.

While some of the objectives of the present invention are disclosed in the prior art, none of the inventions found include all of the requirements identified.

SUMMARY OF THE INVENTION

The present invention addresses all of the deficiencies of prior art cell phone based vehicle control system inventions and satisfies all of the objectives described above.

(1) A cell phone based vehicle control system providing the desired features may be constructed from the following components. A vehicle is provided. The vehicle has an electronic network connected to at least one electrical device in the vehicle. A central processing module is provided. The central processing module has a serial data port connection. A data interface module is provided. The data interface module is serially connected to the central processing module and the electronic network of the vehicle. A transceiver module is provided. The transceiver module is serially connected to the central processing module and the data interface module. A cellular telephone is provided. The cellular telephone communicates wirelessly with the transceiver module.

(2) In a variant of the invention, the central processing module includes at least one analog connection for use with non-electronic network equipped vehicles.

(3) In another variant, the data interface module provides data translation between the vehicle's electronic network and the central processing module.

(4) In still another variant, the transceiver module further includes a first data encryption/decryption unit.

(5) In yet another variant, the transceiver module further includes a Global Positioning System (GPS) unit capable of identifying the location of the vehicle.

(6) In a further variant, the cellular telephone further comprises a second data encryption/decryption unit compatible with the first data encryption/decryption unit.

(7) In still a further variant, the central processing module further includes a vehicle alarm system.

(8) In yet a further variant, the central processing module further comprises a remote starter system.

(9) In another variant of the invention, the cellular telephone operates systems including any of remote locking and unlocking of vehicle doors, trunk and liftgate, remote arming/disarming of an alarm system, remote engine start and stop, remote panic mode on and off, remote driver specific vehicle adjustments and remote auxiliary command functions.

(10) In still another variant, the transceiver module provides vehicle information to the cellular telephone including any of engine and transmission information, tachometer readings, water temperature, oil pressure, battery charge level, vehicle inside temperature, door hood and trunk status, climate control status, tire pressure and vehicle speed sensor information (VSS).

(11) In yet another variant the cellular telephone and the transceiver module provide two-way communication including any of codes, confirmations, instructions and vehicle status and performance information.

(12) In a further variant, a cell phone based vehicle control system includes a vehicle. The vehicle has an electronic network connected to at least one electrical device in the vehicle. A central processing module is provided. The central processing module has a serial data port connection. A data router is provided. The data router is serially connected to the central processing module and the electronic network of the vehicle. A data interface module is provided. The data interface module is serially connected to the data router. A transceiver module is provided. The transceiver module is serially connected to the data router. A cellular telephone is provided. The cellular telephone communicates wirelessly with the transceiver module.

(13) In still a further variant, the data router further includes a connection point for an external computer. The computer provides upgrades, data logging and troubleshooting for the system.

(14) In yet a further variant, the central processing module further includes at least one analog connection for use with non-electronic network equipped vehicles.

(15) In another variant of the invention, the data interface module provides data translation between the vehicle's electronic network and the central processing module.

(16) In yet another variant, the transceiver module further includes a first data encryption/decryption unit.

(17) In still another variant, the transceiver module further includes a Global Positioning System (GPS) unit capable of identifying the location of the vehicle.

(18) In a further variant, the cellular telephone further includes a second data encryption/decryption unit compatible with the first data encryption/decryption unit.

(19) In yet a further variant, the central processing module further includes an vehicle alarm system.

(20) In still a further variant, the central processing module further includes a remote starter system.

(21) In yet a further variant of the invention, the cellular telephone operates systems including any of remote locking and unlocking of vehicle doors, trunk and liftgate, remote arming/disarming of an alarm system, remote engine start and stop, remote panic mode on and off, remote driver specific vehicle adjustments and remote auxiliary command functions.

(22) In another variant of the invention, the transceiver module provides vehicle information to the cellular telephone including any of engine and transmission information, tachometer readings, water temperature, oil pressure, battery charge level, vehicle inside temperature, door hood and trunk status, climate control status, tire pressure and vehicle speed sensor information (VSS).

(23) In a final variant, the cellular telephone and the transceiver module provide two-way communication for transmission including any of codes, confirmations, instructions and vehicle status and performance information.

An appreciation of the other aims and objectives of the present invention and an understanding of it may be achieved by referring to the accompanying drawings and the detailed description of a preferred embodiment.

DESCRIPTION OF THE DRAWINGS

DETAILED DESCRIPTION OF THE PREFERRED EMBODIMENT (1) FIG. 1 illustrates a cell phone based vehicle control system 10 providing the desired features that may be constructed from the following components. An vehicle is provided 14. The vehicle 14 has an electronic network 18 connected to at least one electrical device 22 in the vehicle 14. A central processing module 26 is provided. The central processing module 26 has a serial data port connection 30. A data interface module 34 is provided. The data interface module 34 is serially connected to the central processing module 26 and the electronic network 18 of the vehicle 14. A transceiver module 38 is provided. The transceiver module 38 is serially connected to the central processing module 26 and the data interface module 34. A cellular telephone 42 is provided. The cellular telephone 42 communicates wirelessly with the transceiver module 38.

Figure 1:
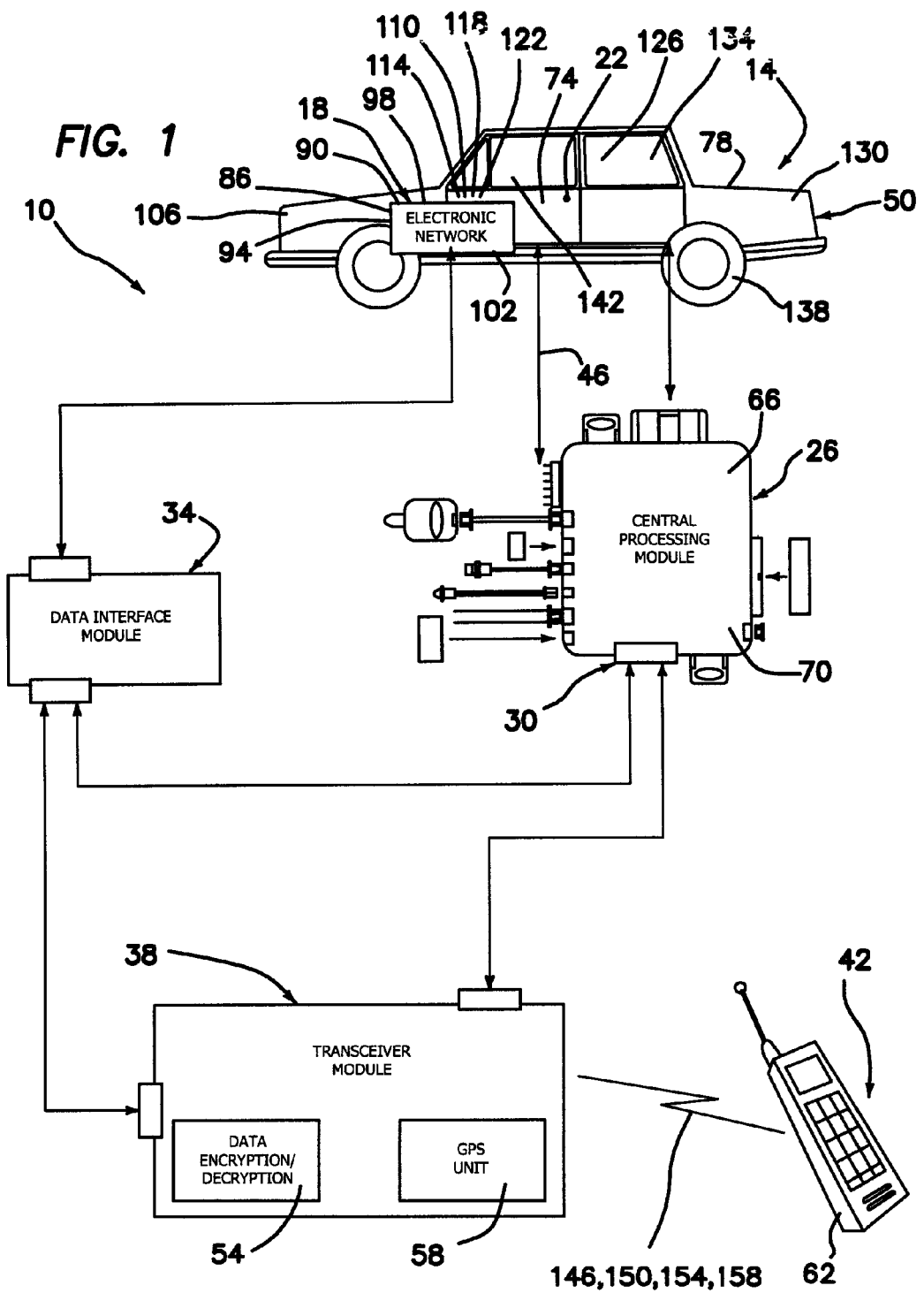
FIG. 1 is a schematic view of a first embodiment of the system.

(2) In a variant of the invention, the central processing module 26 includes at least one analog connection 46 for use with non-electronic network equipped vehicles 50.

(3) In another variant, the data interface module 34 provides data translation between the vehicle's electronic network 18 and the central processing module 26.

(4) In still another variant, the transceiver module 38 further includes a first data encryption/decryption unit 54.

(5) In yet another variant, the transceiver module 38 further includes a Global Positioning System (GPS) unit 58 capable of identifying the location of the vehicle 14.

(6) In a further variant, the cellular telephone 42 further comprises a second data encryption/decryption unit 62 compatible with the first data encryption/decryption unit 54.

(7) In still a further variant, the central processing module 26 further includes an vehicle alarm system 66.

(8) In yet a further variant, the central processing module 26 further comprises a remote starter system 70.

(9) In another variant of the invention, the cellular telephone 42 operates systems including any of remote locking and unlocking of vehicle doors 74, trunk 78 and liftgate (not shown), remote arming/disarming of an alarm system 86, remote engine start and stop 90, remote panic mode on and off 94, remote driver specific vehicle adjustments 98 and remote auxiliary command functions 102.

(10) In still another variant, the transceiver module 38 provides vehicle information to the cellular telephone 42 including any of engine and transmission information 106, tachometer readings 110, water temperature 114, oil pressure 118, battery charge level 122, vehicle inside temperature 126, door, hood and trunk status 130, climate control status 134, tire pressure 138 and vehicle speed sensor information (VSS) 142.

(11) In yet another variant the cellular telephone 42 and the transceiver module 38 provide two-way communication including any of codes 146, confirmations 150, instructions 154 and vehicle status and performance information 158.

Figure 2:
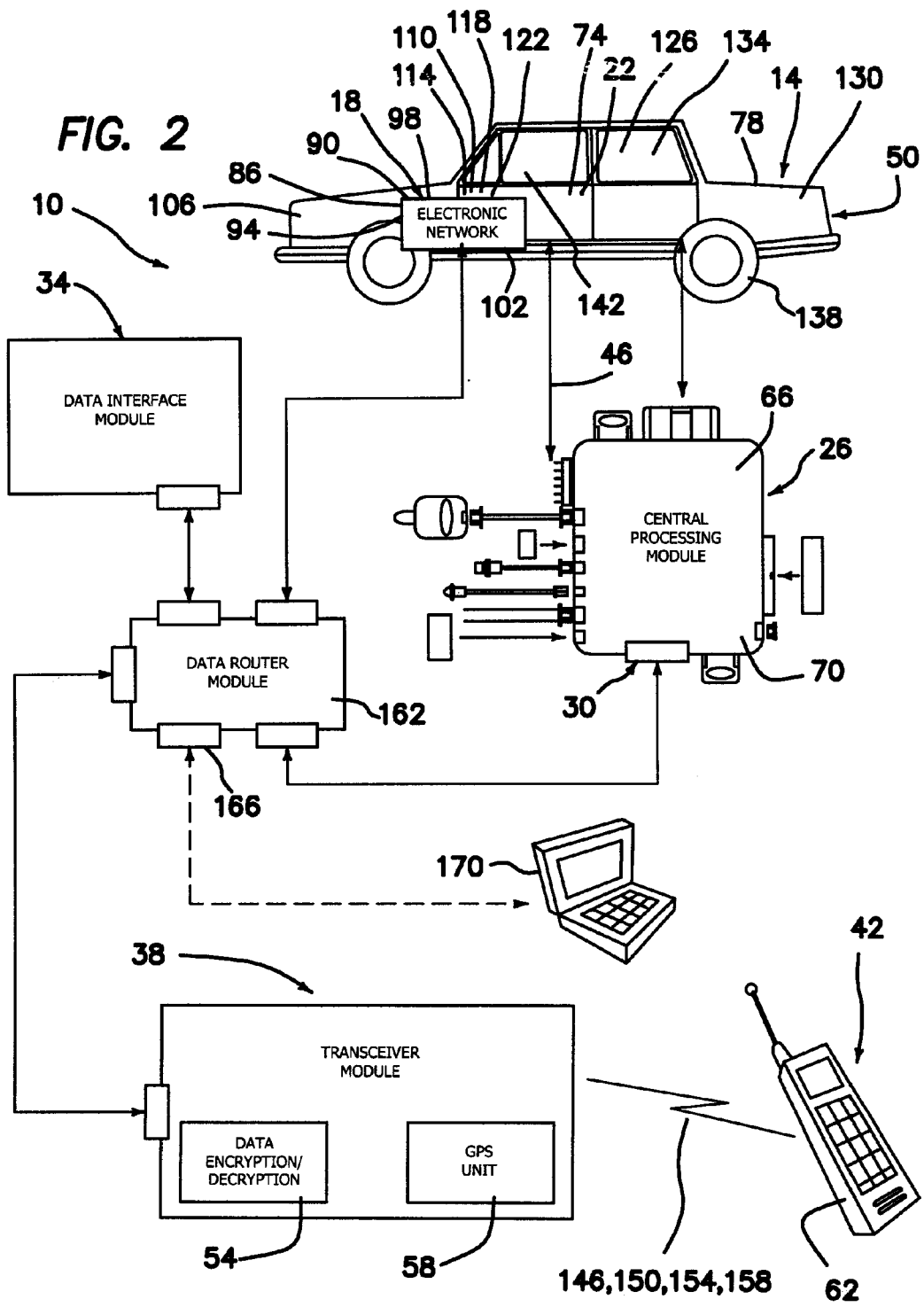
FIG. 2 is a schematic view of a second embodiment of the system including a data router module.

(12) In a further variant, as illustrated in FIG. 2, a cell phone based vehicle control system 10 includes a vehicle 14. The vehicle 14 has an electronic network 18 connected to at least one electrical device 22 in the vehicle 14. A central processing module 26 is provided. The central processing module 26 has a serial data port connection 30. A data router 162 is provided. The data router 162 is serially connected to the central processing module 26 and the electronic network 18 of the vehicle 14. A data interface module 34 is provided. The data interface module 34 is serially connected to the data router 162. A transceiver module 38 is provided. The transceiver module 38 is serially connected to the data router 162. A cellular telephone 42 is provided. The cellular telephone 42 communicates wirelessly with the transceiver module 38.

(13) In still a further variant, the data router 162 further includes a connection point 166 for an external computer 170. The computer 170 provides upgrades, data logging and troubleshooting for the system 10.

(14) In yet a further variant, the central processing module 26 further includes at least one analog connection 46 for use with non-electronic network equipped vehicles 50.

(15) In another variant of the invention, the data interface module 34 provides data translation between the vehicle's electronic network 18 and the central processing module 26.

(16) In yet another variant, the transceiver module 38 further includes a first data encryption/decryption unit 54.

(17) In still another variant, the transceiver module 38 further includes a Global Positioning System (GPS) unit 58 capable of identifying the location of the vehicle 14.

(18) In a further variant, the cellular telephone 42 further includes a second data encryption/decryption unit 62 compatible with the first data encryption/decryption unit 54.

(19) In yet a further variant, the central processing module 26 further includes an vehicle alarm system 66.

(20) In still a further variant, the central processing module 26 further includes a remote starter system 70.

(21) In yet a further variant of the invention, the cellular telephone 42 operates systems including any of remote locking and unlocking of vehicle doors 74, trunk 78 and liftgate (not shown), remote arming/disarming of an alarm system 86, remote engine start and stop 90, remote panic mode on and off 94, remote driver specific vehicle adjustments 98 and remote auxiliary command functions 102.

(22) In another variant of the invention, the transceiver module 38 provides vehicle information to the cellular telephone 42 including any of engine and transmission information 106, tachometer readings 110, water temperature 114, oil pressure 118, battery charge level 122, vehicle inside temperature 126, door hood and trunk status 130, climate control status 134, tire pressure 138 and vehicle speed sensor information (VSS) 142.

(23) In a final variant, the cellular telephone 42 and the transceiver module 38 provide two-way communication including any of codes 146, confirmations 150, instructions 154 and vehicle status and performance information 158.

The cell phone based vehicle control system 10 has been described with reference to particular embodiments. Other modifications and enhancements can be made without departing from the spirit and scope of the claims that follow.

The invention claimed is:

1. A cell phone based vehicle control system comprising:
   a vehicle, said vehicle having an electronic network connected to at least one electrical device in the vehicle;
   a central processing module, said central processing module having a serial data port connection;
   a data interface module, said data interface module being serially connected to said central processing module and said electronic network of said vehicle;

a transceiver module, said transceiver module being serially connected to said central processing module and said data interface module;

said transceiver module having a first data encryption/decryption unit and a Global Positioning System (GPS) unit capable of identifying the location of said vehicle; and a cellular telephone, said cellular telephone communicating wirelessly with said transceiver module.

2. The cell phone based vehicle control system, as described in claim 1, wherein said central processing module further comprises at least one analog connection for use with non-electronic network equipped vehicles.

3. The cell phone based vehicle control system, as described in claim 1, wherein said data interface module provides data translation between said vehicle's electronic network and said central processing module.

4. The cell phone based vehicle control system, as described in claim 1, wherein said cellular telephone further comprises a second data encryption/decryption unit compatible with said first data encryption/decryption unit.

5. The cell phone based vehicle control system, as described in claim 1, wherein said central processing module further comprises an vehicle alarm system.

6. The cell phone based vehicle control system, as described in claim 1, wherein said central processing module further comprises a remote starter system.

7. The cell phone based vehicle control system, as described in claim 1, wherein said cellular telephone operates auxiliary automotive systems comprising any of remote locking and unlocking of vehicle doors, trunk and liftgate, remote arming/disarming of an alarm system, remote engine start and stop, remote panic mode on and off, remote driver specific vehicle adjustments and remote auxiliary command functions.

8. The cell phone based vehicle control system, as described in claim 1, wherein said transceiver module provides vehicle information to said cellular telephone comprising any of engine and transmission information, tachometer readings, water temperature, oil pressure, battery charge level, vehicle inside temperature, door hood and trunk status, climate control status, tire pressure and vehicle speed sensor information (VSS).

9. The cell phone based vehicle control system, as described in claim 1, wherein said cellular telephone and said transceiver module provide two-way communication comprising any of codes, confirmations, instructions and vehicle status and performance information.

10. A cell phone based vehicle control system comprising:
a vehicle, said vehicle having an electronic network connected to at least one electrical device in the vehicle;
a central processing module, said central processing module having a serial data port connection;
a data router, said data router being serially connected to said central processing module and said electronic network of said vehicle;
a data interface module, said data interface module being serially connected to said data router;

a transceiver module, said transceiver module being serially connected to said data router; and
a cellular telephone, said cellular telephone communicating wirelessly with said transceiver module.

11. The cell phone based vehicle control system, as described in claim 10, wherein said data router further comprises a connection point for an external computer, said computer providing upgrades, data logging and troubleshooting for said system.

12. The cell phone based vehicle control system, as described in claim 10, wherein said central processing module further comprises at least one analog connection for use with non-electronic network equipped vehicles.

13. The cell phone based vehicle control system, as described in claim 10, wherein said data interface module provides data translation between said vehicle's electronic network and said central processing module.

14. The cell phone based vehicle control system, as described in claim 10, wherein said transceiver module further comprises a first data encryption/decryption unit.

15. The cell phone based vehicle control system, as described in claim 10, wherein said transceiver module further comprises a Global Positioning System (GPS) unit capable of identifying the location of the vehicle.

16. The cell phone based vehicle control system, as described in claim 14, wherein said cellular telephone further comprises a second data encryption/decryption unit compatible with said first data encryption/decryption unit.

17. The cell phone based vehicle control system, as described in claim 10, wherein said central processing module further comprises an vehicle alarm system.

18. The cell phone based vehicle control system, as described in claim 10, wherein said central processing module further comprises a remote starter system.

19. The cell phone based vehicle control system, as described in claim 10, wherein said cellular telephone operates auxiliary automotive systems comprising any of remote locking and unlocking of vehicle doors, trunk and liftgate, remote arming/disarming of an alarm system, remote engine start and stop, remote panic mode on and off, remote driver specific vehicle adjustments and remote auxiliary command functions.

20. The cell phone based vehicle control system, as described in claim 10, wherein said transceiver module provides vehicle information to said cellular telephone comprising any of engine and transmission information, tachometer readings, water temperature, oil pressure, battery charge level, vehicle inside temperature, door hood and trunk status, climate control status, tire pressure and vehicle speed sensor information (VSS).

21. The cell phone based vehicle control system, as described in claim 10, wherein said cellular telephone and said transceiver module provide two-way communication comprising any of codes, confirmations, instructions and vehicle status and performance information.

* * * * *